Patented Mar. 6, 1934

1,949,524

UNITED STATES PATENT OFFICE 1,949,524

GRAY BURNED BRICK AND METHOD OF MAKING

Ralph L. Atkinson, Dorchester, Mass., assignor to Arthur D. Little, Incorporated, Cambridge, Mass., a corporation of Massachusetts No Drawing. Application May 26, 1930, Serial No. 455,957

2 Claims. (Cl. 106—11)

This invention relates to gray building brick and to a method of making the same.

It is well known that most clays, upon being molded and fired at suitable temperatures to make them sufficiently strong, develop a red coloration due to the presence of iron compounds. Even with relatively pure clays or kaolins, this tendency is frequently encountered and in practically all clays which may be employed for building brick, the coloration is decidedly yellow or buff.

For architectural purposes, however, and especially where artistic effects are desired, it may be preferable to obtain a building material which shall be free from such yellow or buff coloration and which shall resemble natural stone such as gray limestone, granite, and the like.

It is accordingly an object of this invention to provide a method of making from the usual available clays and like ceramic materials which ordinarily burn to produce a buff coloration, a product which shall be substantially without color, such as white or light gray. It is also an object to provide a finished product which may still further resemble natural stone by presenting black specks, indiscriminately distributed therein. Other objects will appear from the following disclosure.

The method of the invention includes intimately mixing the raw clay, which may contain as much as 2% or more of iron oxide, preferably in finely pulverized dry condition, with finely ground cobalt oxide, in an amount varying from approximately .03% to 0.10%, by weight, depending upon the amount of iron oxide present and the desired shade of the finished product. The mixture may then be mixed with water, molded and fired in accordance with usual ceramic practices and the resulting product is found to be devoid of the characteristic buff coloration of iron compounds on the one hand and without the blue coloration of cobalt oxide on the other. It is a true gray.

A preferred example of actual practice according to the invention will be described with reference to a buff burning clay known as the Lower Kittaning deposit of Pennsylvania, which may have analyses as follows:

|  | No. 1 | No. 2 | No. 3 | No. 4 |
|---|---|---|---|---|
|  | Percent | Percent | Percent | Percent |
| Silica | 70.73 | 70.66 | 68.28 | 63.64 |
| Alumina | 16.95 | 17.33 | 18.41 | 23.53 |
| Iron oxide | 2.00 | 1.72 | 1.43 | 2.12 |
| Titanium oxide | 1.20 | 1.20 | 1.00 | 2.33 |
| Calcium oxide | .28 | .20 | .16 | None |
| Magnesium oxide | 1.00 | .65 | 1.22 | 1.08 |
| Alkali oxides | 1.72 | 1.86 | 1.88 | .58 |
| Sulphuric anhydride | Trace | Trace | .54 | ------ |
| Loss of ignition | 6.00 | 6.15 | 6.75 | 6.72 |

The clay is pulverized to the desired degree of fineness and may, for continuous operation, be fed to a mixer in the form of a continuous stream. To this stream of dry clay powder may be introduced a much smaller but continuous stream of finely ground and air separated cobalt oxide (cobaltic or cobaltous oxide or cobalt ore) which is preferably finer than 300 mesh and the individual particles of which may in large part or completely approach colloid dimensions.

The combined stream of powders may be further mixed by subjecting to an air blast in a suitable mixing chamber or the like and then mixed with the required amount of water to develop the degree of plasticity desired. The wet mass may now be withdrawn, molded, dried and fired in accordance with the commonly known procedures of the art, as for example by molding into the form of bricks, drying, and firing in a kiln to the necessary temperature (e. g. cone 3) and for a sufficient length of time to develop the strength, color, and texture of the finished product.

Building bricks as thus made are uniformly light gray and present a characteristically new and attractive appearance not heretofore acquired in products made by procedures of the prior art. The yellow coloration of the iron oxide is eliminated and no perceptible contribution of color is effected by the cobalt oxide.

On account of the relatively small amount of cobalt oxide which is found to be adequate to accomplish the result, it is thought that in the finely divided form in which it is employed, the individual particles are selectively adsorbed by the colored iron oxide or iron containing surfaces of the clay particles, so that optical neutralization at least within the degree of resolution of which the naked eye is capable, is realized.

It is further found that the simulation of speckled natural stone, upon the gray background, without staining or otherwise altering its distinctive properties, may be obtained by incorporating into the mixture a small amount of black manganese ore (such as manganite) preferably in relatively coarse granules. If used in a fine state of subdivision the coloration will be uniform and light whereas larger quantities will tend to darken the general shade of gray of the resulting brick and with coarse granules, the product resembles horn blende granites.

It is to be understood that whereas the invention has been described with reference to the use of the oxides of cobalt, the blue characteristics which are imparted to the finished product are intrinsically attributable to the formation therefrom of cobalt silicates which are typically blue compounds. Hence, cobalt compounds other than the oxides may be employed which are convertible to silicates in the subsequent treatment of the material and are to be considered as equivalents therefor. For example, cobalt chloride and cobalt nitrate may be so used, which are soluble; but water insoluble compounds are preferable so long as they are effective to provide the blue silicate compound in the ultimate product.

I claim:

1. A method of making gray brick, resembling granite, comprising as steps mixing a normally buff burning clay with a small amount of finely divided compound of cobalt characterized by being effective to provide a cobalt silicate, and incorporating coarse granules of black manganese ore therewith.

2. A gray brick, resembling granite, comprising a normally buff-burning clay, a small amount of cobalt silicate and coarse granules of black manganese ore.

RALPH L. ATKINSON.